(No Model.)
J. MARSEE & T. MORFORD.
CULTIVATOR.
No. 576,595. Patented Feb. 9, 1897.
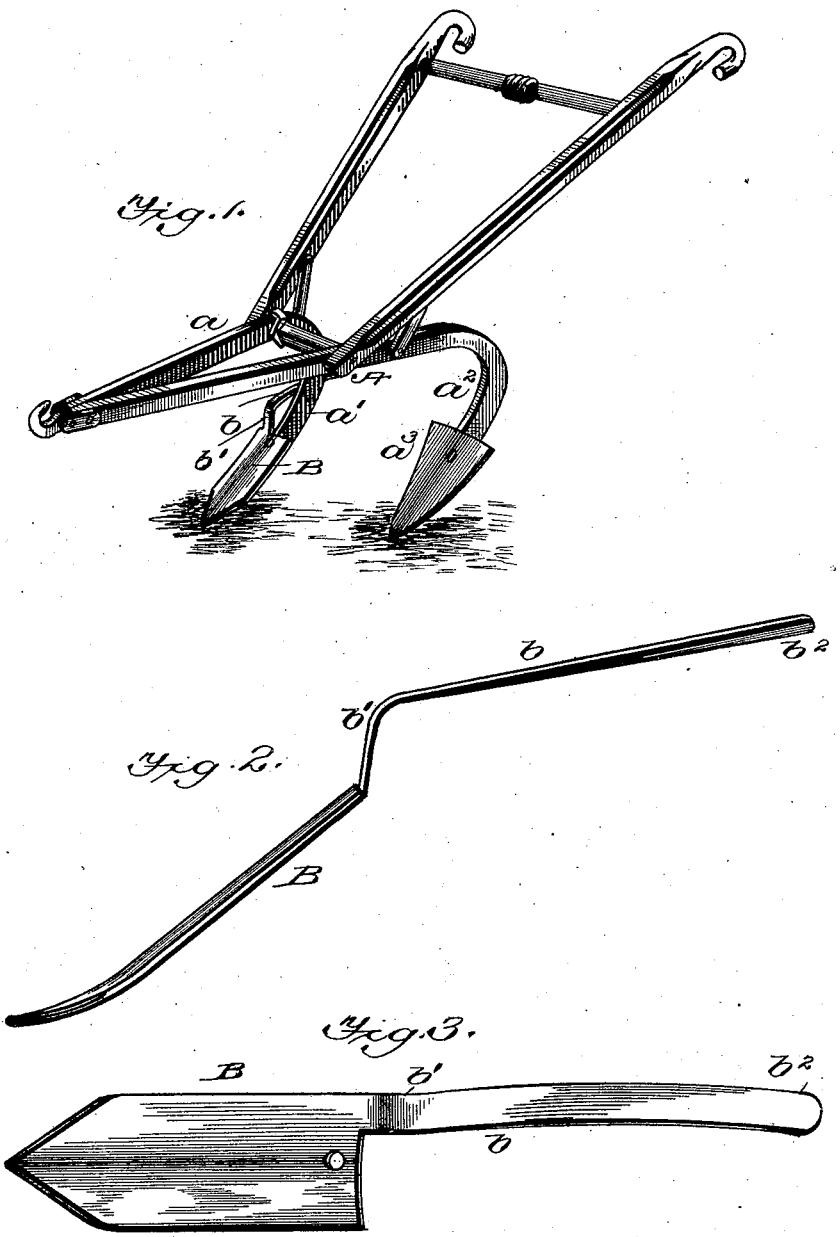

UNITED STATES PATENT OFFICE.

JONAH MARSEE AND THOMAS MORFORD, OF BOURNE, KENTUCKY.

CULTIVATOR.

SPECIFICATION forming part of Letters Patent No. 576,595, dated February 9, 1897.

Application filed May 14, 1896. Serial No. 591,591. (No model.)

*To all whom it may concern:*

Be it known that we, JONAH MARSEE and THOMAS MORFORD, citizens of the United States, residing at Bourne, in the county of Garrard and State of Kentucky, have invented certain new and useful Improvements in Cultivators; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention contemplates certain new and useful improvements in cultivators.

The object of the invention is to provide the advance plow point or shovel of a cultivator with an attachment which will serve to raise or elevate the leaves of growing plants, such as tobacco, so as to prevent them being covered by the dirt thrown to one side by the rear or second shovel.

The invention will be hereinafter fully set forth, and particularly pointed out in the claim.

In the accompanying drawings, Figure 1 is a view in perspective of a cultivator, showing our improvement. Fig. 2 is an enlarged view of one of the shovels detached.

Referring to the drawings, A designates a cultivator; $a$, the frame thereof; $a'$ and $a^2$, the shovel-standards, one being located in advance of the other, as customary in cultivators of this class, and $a^3$ an ordinary plow-point or cultivator-shovel secured on standard $a^2$.

B is the plow point or shovel, secured to the forward standard $a'$. From the upper rear end of this shovel, in line with one side edge thereof, extends an arm $b$, which for a short distance is extended upwardly, as at $b'$, and thence rearwardly, as at $b^2$. This arm is long and narrow and is preferably slightly curved or inclined toward its outer edge and in the direction of its length.

In practice as the cultivator is at work the arm $b$ serves to raise the leaves of the plants and hold them away from the ground, thereby protecting them from being covered by the earth thrown up by the second or following shovel.

The advantages of our invention are apparent. The arm can be made integral with the shovel, or it may be rigidly secured thereto. By extending this arm upwardly the plants are gradually raised and held out of the way, and by giving to said arm the slight curvature shown no injury will result to the plants by cutting, and the plants rest on said arm as the latter moves under them. The addition of the arm adds but little to the cost of the shovel, but the results obtained are of very decided advantage.

We claim as our invention—

A plow point or shovel for cultivators having an arm extending upwardly from the upper, rear end thereof and thence rearwardly in continuation of and on a line with one side edge of said point or shovel, said arm being waved or curved longitudinally of its length, a portion of one longitudinal edge thereof occupying a plane lower than the other side edge, as and for the purpose set forth.

In testimony whereof we affix our signatures in presence of two witnesses.

JONAH MARSEE.
THOMAS MORFORD.

Witnesses:
GARRET WOOD,
R. A. MCGRATH, Jr.